April 9, 1957  E. WILDHABER  2,787,939

METHOD OF CUTTING TOOTHED FACE COUPLING MEMBERS

Filed April 19, 1954  2 Sheets-Sheet 1

INVENTOR.
ERNEST WILDHABER
BY Richard W. Treverton
ATTORNEY

April 9, 1957     E. WILDHABER     2,787,939
METHOD OF CUTTING TOOTHED FACE COUPLING MEMBERS
Filed April 19, 1954     2 Sheets-Sheet 2
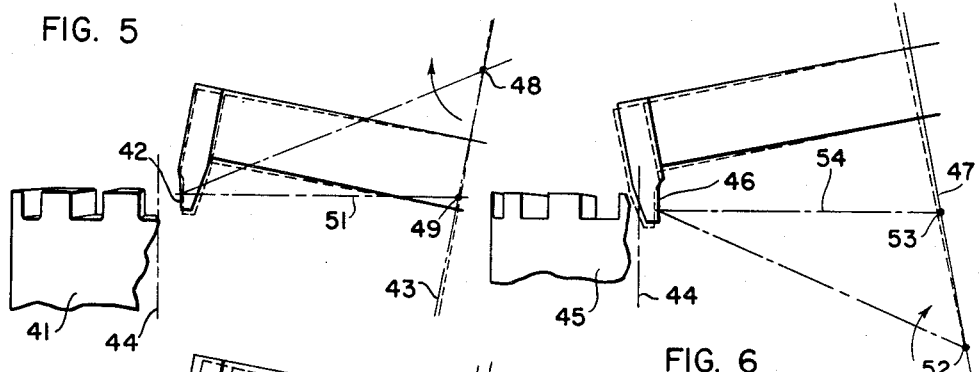
FIG. 5
FIG. 6
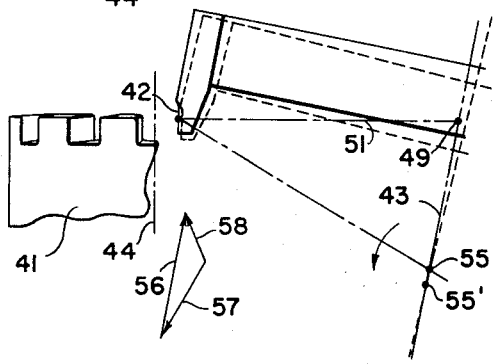
FIG. 7
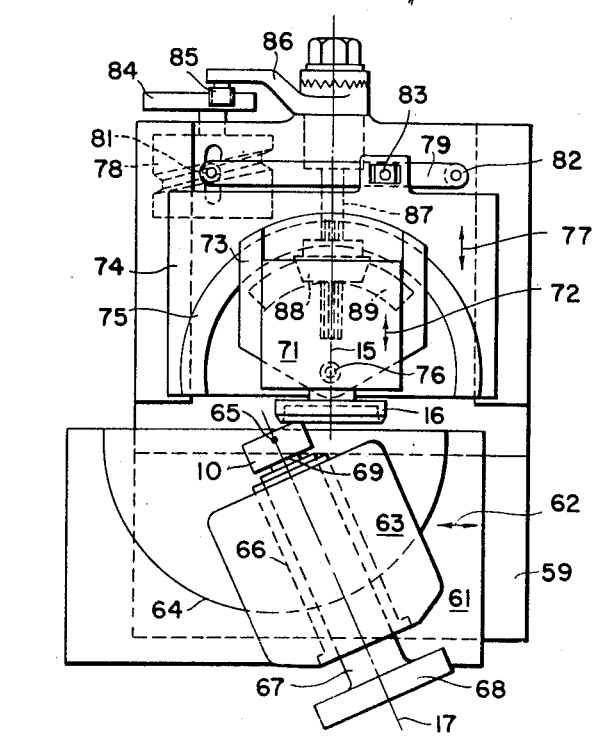
FIG. 8
INVENTOR.
ERNEST WILDHABER
BY
Richard W. Treverton
ATTORNEY

United States Patent Office 2,787,939
Patented Apr. 9, 1957

2,787,939

METHOD OF CUTTING TOOTHED FACE COUPLING MEMBERS

Ernest Wildhaber, Brighton, N. Y., assignor to The Gleason Works, Rochester, N. Y., a corporation of New York Application April 19, 1954, Serial No. 424,196

13 Claims. (Cl. 90—9.4)

The present invention relates to an improvement in the method of cutting toothed face coupling or clutch members disclosed in my prior Patent 2,427,641 granted September 16, 1947.

In the method of the prior patent the cutter, which may be either a bladed cutting tool or an abrasive wheel, is positioned to act on the toothed member in two spaced zones, so as to cut simultaneously the opposite sides of two spaced teeth. After being fed into full depth to produce these two tooth sides the cutter is withdrawn, the coupling member is indexed to bring successive tooth spaces into cutting position and then the cutter is again fed into full depth. These steps are repeated until every tooth has been cut on both sides. When finish cutting by this method from a solid blank three different cutting conditions occur. At first the cutter acts on solid stock in both cutting zones. After several indexing operations, it cuts in solid stock in only one zone and in a partially cut tooth space in the other zone. Finally, after further indexing operations, it cuts in both zones in partially cut tooth spaces. Because of the difference in cutting loads under these three different conditions there is great difficulty in cutting teeth of exactly the same shape and spacing all around the coupling member, even with a very rigid machine.

The object of the present invention is an improvement in the method whereby the finish cutting of every tooth will be under exactly the same conditions, and, preferably, without any accompanying cutting of the root surfaces, so that the resulting teeth will be of the highest quality as to shape, spacing and surface finish. The method may be carried out on a machine of the general kind described in my prior Patent 2,464,913, granted March 22, 1949, in connection with Fig. 26 thereof.

In the accompanying drawings:

Figs. 5 and 6 are views respectively similar to Figs. 3 and 4 but illustrating an alternative form of coupling;

Fig. 7 is a view similar to Fig. 5, illustrating an alternative method of cutting; and, Fig. 8 is a plan view which illustrates diagrammatically the structure of one kind of machine on which the present invention may be practiced.

Figure 1:
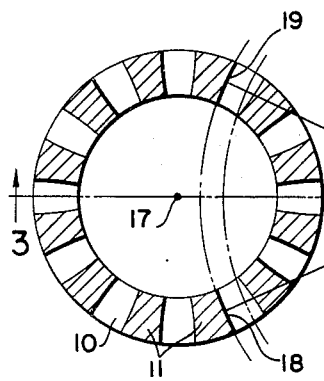
Fig. 1 is a cross-section, in the plane 1—1 of Fig. 3, through a coupling member having concave teeth.
Figure 3:
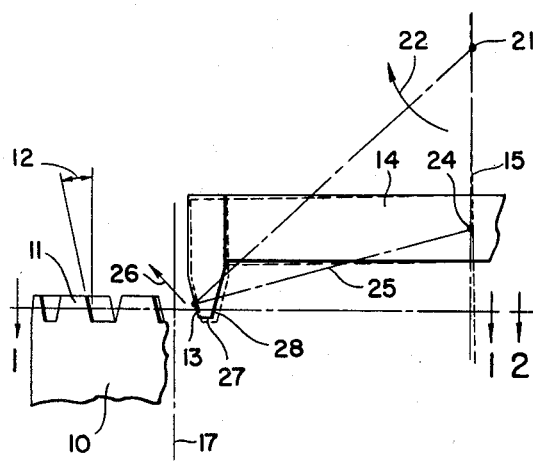
Fig. 3 is a view in the cutter axial plane 3—3 of Fig. 1.

The coupling member 10 shown in Figs. 1 and 3 has teeth 11 whose side faces are of positive pressure angle 12 and of concave lengthwise curvature, being cut by the outside cutting edges 13 of a bladed cutter 14 rotating about its axis 15, or by an equivalent annular abrasive wheel 16, Fig. 8, which presents an identical conical cutting surface to the work. The cutter axis 15 is so related to the axis 17 of the coupling, in this case parallel thereto, that the cutter acts in two spaced zones, to thereby cut simultaneously the opposite concave sides 18 and 19 of two spaced teeth 11. The cutter is rotated about and fed in the direction of its axis into full depth relation to the work member 10, then is withdrawn and the work indexed by one circular pitch about its axis 17 to bring successive tooth spaces into cutting position. This cycle is repeated until all of the tooth surfaces of the work have been cut.

It will be seen that when cutting the particular twelve tooth member 10 shown in Fig. 1, during the first four such cycles the tool will cut at both cutting zones into previously unslotted tooth spaces; during the next four cycles it will cut into an unslotted space in one cutting zone and in a previously slotted space in the other zone; while during the last four cycles it will cut in both zones in previously slotted spaces. As mentioned above these three different cutting conditions result in different deflections of various parts of the machine, with the result that all teeth are not cut exactly alike.

According to the present invention this difficulty is eliminated in the following manner: During each cutting cycle, after the cutter has been fed to full depth relation to the work, i. e. to the position shown in broken lines in Fig. 3, finish cutting is effected by feeding the cutter through a very small angle about axis 21 in the direction of arrow 22. Axis 21 is perpendicular to the common plane 23 of axes 15 and 17, and intersects axis 15 at a point spaced substantially from point 24, which is the intersection of axis 15 with the normals 25, at the centers of tooth surfaces 18 and 19, to the conical cutting surface described by edges 13. Accordingly the cutter finishes surfaces 18 and 19 by a feed that is approximately in the direction of arrow 26 in Fig. 3. The tip cutting edges 27, which do most of the work during the infeed of the cutter, and also the inside edges 28, are clear of the work during the finish cutting. Every tooth 11 around the member 10 is finish cut under exactly these same conditions.

The magnitude of the finishing feed is greatly exaggerated in the drawings. In practice the cutter is pivoted only enough to remove a few thousandths of an inch of stock from the teeth. After a very brief dwell at the end of the finishing feed, only long enough to assure complete transversal of the tooth faces by cutting blades, the depth feed is reversed to withdraw the cutter to permit indexing of the work.

Figure 2:
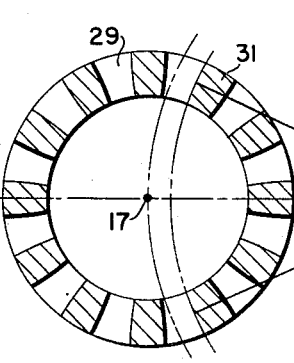
Fig. 2 is a cross-section similar to Fig. 1 through the mating clutch member which has convex teeth.
Figure 4:
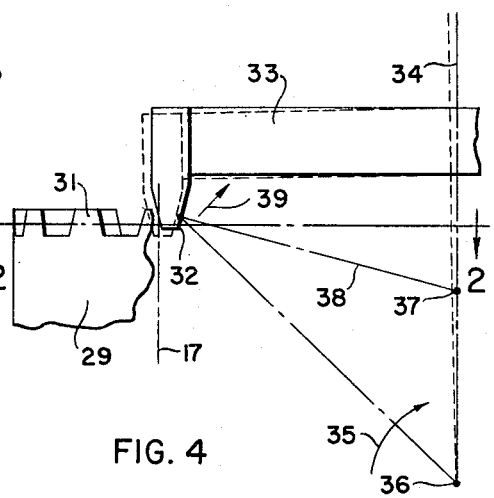
Fig. 4 is a view in the cutter axial plane 4—4 of Fig. 2.

The coupling member 29, Figs. 2 and 4, for mating with member 10, is produced in a similar manner, but its teeth 31 are cut to convex lengthwise shape by the inside cutting edges 32 of cutter 33 rotating about axis 34, or by an equivalent abrasive wheel. In this case, after the cutter 33 has been fed to full depth position, shown in dotted lines in Fig. 4, finish cutting is effected by feeding it angularly in the direction of arrow 35 about axis 36 to its full line position. The axis 36, which is perpendicular to the common plane of axes 17 and 34, intersects the latter at a point spaced outwardly beyond the intersection point 37 of surface normals 38, so that the finish feed is in the direction of arrow 39 and moves the tip and outside edges of the cutter clear of the work.

Figs. 5 and 6 correspond respectively to Figs. 3 and 4, but illustrate the relationship of the cutters to the work when producing teeth of zero pressure angle. In order to permit the cutter blades to be relief ground in an axial direction, so that sharpening will not change the effective cutter diameter, the finish cutting edges are inclined to the cutter axis. To produce zero or low pressure angle teeth the cutter axis must then be inclined to the work axis. Thus in Fig. 5 the concave zero-pressure-angle sides of the teeth of coupling member 41 are produced with outside cutting edges 42 which are inclined to the cutter axis 43, and the latter is inclined to work axis 44; while in Fig. 6 the tooth sides of mating coupling member 45 are cut with inside cutting edges 46 which are inclined to cutter axis 47 and that axis is inclined to the work axis 44. In both cases the feed into full depth position may be in the general direction of the cutter axis, and, after full depth is reached, with the cutters in their dotted line positions, they may be fed pivotally through a small angle to their terminal positions shown in full lines where they finish cut. In Fig. 5 this pivoting is about axis 48 which is perpendicular to the common plane of axes 44 and 43, and intersects axis 43 at a point spaced inwardly from the intersection point 49 of the mean surface normal 51. In Fig. 6 the pivotal finishing feed is about the perpendicular axis 52 which intersects the cutter axis at a point spaced outwardly beyond the intersection point 53 of mean surface normal 54.

A modified cutter feed is illustrated in Fig. 7, where the coupling member 41 and the cutter with outside cutting edges 42 are identical with those shown in Fig. 5, and the cutter feed into the full depth, dotted line position is in or approximately in the direction of the cutter axis 43. However when this position is reached the depth feed is reversed and is accompanied by a pivoting of the cutter in the direction of the curved arrow about perpendicular pivot axis 55 which intersects the cutter axis at a point outwardly beyond the intersection point 49 of mean surface normal 51. The reverse depth feed shifts the pivot axis from 55' to 55 as the pivoting proceeds. The same result is attained as in Fig. 5 even though the direction of the pivotal feed and the location of the pivot feed axis relation to the intersection point of the mean surface normal are reversed. This is possible for the reason that the rate of reverse depth feed, indicated at 56 on the vector diagram superimposed on Fig. 7, is in such relation to the component of cutter motion 57 resulting from the pivoting about axis 55 as to produce a resultant feed 58 which is in the same direction, or approximately the same direction, as the feed which results directly in Fig. 5 from pivoting in the opposite direction about axis 48. It will be understood that this same principle illustrated in Fig. 7 may be applied in cutting the mating coupling member 45, Fig. 6. It will also be apparent that the reverse depth feed and the pivoting about axis 55 need not be simultaneous. If desired the pivoting may take place during a dwell in the reverse feed occurring after the pivot axis has shifted from 55' to 55.

For practicing the method of the present invention a machine of the general kind disclosed in my prior Patent No. 2,464,913, granted March 22, 1949, may be employed. As shown in Fig. 8, this machine includes a base 59 on which a work slide 61 is adjustable in the direction of arrow 62. A column 63 is adjustable angularly on the slide on arcuate way 64 about vertical axis 65. Vertically adjustable on the column is a slide 66 carrying a housing 67 and index mechanism 68 for a work spindle 69 on which is mounted the coupling member being cut, in this instance the coupling 10 of Figs. 1 and 3. Preferably the spindle housing 67 is adjustable in slide 66 in the direction of work axis 17.

The cutter, in this case abrasive wheel 16, is rotated about axis 15 by a motor or other suitable drive within or extending through a cutter spindle housing 71 which is adjustable in the direction of arrow 72 on a swinging base 73 which in turn is angularly movable on a cutter slide 74. This angular movement is on an arcuate way 75 on slide 74 about vertical axis 76. Slide 74 is reciprocated on the base 59, in the direction of arrow 77, by a cam 78 acting through a lever 79, the latter carrying a cam follower roller 81 and being fulcrumed upon the base and pivoted to slide 74 respectively at 82 and 83. The cam 78 is rotatable in the base on the same shaft with a cam 84 which acts to swing the rotating cutter 16 about axis 76, which represents axis 21 of Figs. 1 and 3, in the desired time relation with its rectilinear motion in direction 77, which corresponds to the direction of the depth feed along axis 15 of Figs. 1 and 3. The cam 84 acts through a cam follower roller 85 on an arm 86 secured to a shaft 87 journaled in the base. Angular motion of this shaft is effective through a bevel pinion 88 that is splined to the shaft and that moves axially as a unit with slide 74, and through a bevel gear segment 89 that mates with the pinion 88 and is secured to the swinging base 73, to turn the latter about axis 76. The machine preferably includes a means, not shown, which operably connects the cams 78 and 84 with the index mechanism 68 so that once during each rotation of the cams, at a time when cam 78 has withdrawn the cutter from the work, the latter will be advanced by one circular pitch.

It will be understood that by suitable adjustment of the machine the rectilinear feed direction 77 and the location of pivot axis 76 in the machine may also be made to correspond with those necessary to cut the several clutches shown in Figs. 2 and 4 to 7, inclusive. The same rectilinear motion feed cam 78 may be used for a wide range of work, while the rate and timing of the angular feed may be varied respectively by substituting cams 84 of different contours and by varying the angular position of the selected cam 84 on its drive shaft.

Having now described the preferred manner of practicing my invention, what I claim is:

1. The method of cutting a face toothed member with a rotary cutter positioned to cut simultaneously the opposite sides of spaced teeth of the member, which comprises effecting a relative feed to bring the cutter to substantially full depth relation to the member while holding the member against rotation about its own axis, and then finish cutting by feeding the cutter to shift the loci of cutting in a direction inclined to the direction of said relative feed to remove stock from said opposite sides of spaced teeth.

2. The method of claim 1 in which the finish cutting feed is in a direction to separate the cutter from the bottom lands of the member.

3. The method of claim 1 in which the cutter and the member are so positioned that their axes lie in a common plane during said relative feed and also during the finish cutting.

4. The method of claim 3 in which the finish-cutting feed movement is an angular motion about an axis perpendicular to the common plane of the axes of the cutter and the member.

5. The method of claim 4 in which the axis of the angular motion intersects the cutter axis.

6. The method of claim 4 in which the angular motion is in a direction to separate the cutter from the bottom lands of the member.

7. The method of claim 4 in which the angular motion is in a direction to move the cutter toward the bottom lands of the member.

8. The method of claim 7 in which prior to said angular motion said feed to substantially full depth is reversed, to thereby prevent cutting the bottom lands during the finish cutting relative feed movement.

9. The method of claim 7 in which concomitantly with said angular motion the feed to substantially full depth is reversed, to thereby prevent further cutting of the bottom lands produced during the feed to full depth.

10. The method of simultaneously cutting opposite tooth surfaces on spaced teeth of a face toothed member with a rotating cutter, comprising effecting a relative feed motion between the cutter and the member while maintaining the cutter axis and the axis of the member in a common plane, and holding the member against rotation about its axis, said feed motion including an angular motion about a pivot axis perpendicular to said common plane and a translatory motion of the pivot axis relative to the member.

11. The method of claim 10 in which said pivot axis intersects the cutter axis.

12. The method of claim 10 in which said translatory motion is rectilinear.

13. The method of claim 10 in which said pivot axis intersects the cutter axis and said translatory motion is rectilinear.

References Cited in the file of this patent
UNITED STATES PATENTS

| | | |
|---|---|---|
| 2,405,171 | Wildhaber | Aug. 6, 1946 |
| 2,438,329 | Wildhaber | Mar. 23, 1948 |
| 2,464,913 | Wildhaber | Mar. 22, 1949 |